United States Patent
Gossez et al.

(10) Patent No.: US 6,820,304 B1
(45) Date of Patent: Nov. 23, 2004

(54) WINDSCREEN WIPER DEVICE

(75) Inventors: Paul Gossez, Longwy (FR); Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 0 days.

(21) Appl. No.: 10/110,357

(22) PCT Filed: Oct. 2, 2000

(86) PCT No.: PCT/EP00/09861

§ 371 (c)(1),
(2), (4) Date: Aug. 13, 2002

(87) PCT Pub. No.: WO01/26942

PCT Pub. Date: Apr. 19, 2001

(30) Foreign Application Priority Data

Oct. 11, 1999 (EP) .............................................. 99203311

(51) Int. Cl.⁷ ............................... B60S 1/32; B60S 1/38
(52) U.S. Cl. ................................. 15/250.46; 15/250.44
(58) Field of Search .......................... 15/250.46, 250.44, 15/250.361, 250.31, 250.32; 403/24, 79, 67, 163

(56) References Cited

U.S. PATENT DOCUMENTS 4,286,351 A * 9/1981 Mower et al. ........... 15/250.46
5,564,157 A 10/1996 Kushida et al.
5,647,087 A 7/1997 Arai

FOREIGN PATENT DOCUMENTS

| DE | 8808315 | | 11/1988 | |
|----|---------|---|---------|---|
| EP | 0289293 | | 11/1988 | |
| EP | 0592246 | | 4/1994 | |
| EP | 0761516 | | 3/1997 | |
| FR | 2448460 | | 9/1980 | |
| FR | 2491847 | | 4/1982 | |
| FR | 2751597 | | 1/1998 | |
| GB | 2055561 | | 3/1981 | |
| WO | 90/05078 | * | 5/1990 | .............. 15/250.46 |

* cited by examiner

Primary Examiner—Gary K. Graham
(74) Attorney, Agent, or Firm—Howard & Howard

(57) ABSTRACT

A windscreen wiper device comprising an oscillating arm and a frame connected thereto for receiving a wiper blade (5), which frame includes a secondary yoke (3) which is pivotally connected to a primary yoke or carrier (1) about a pivot axis (2), wherein both the carrier primary yoke (1) and the secondary yoke (3) are of at least substantially U-shaped cross section at the location of their interconnection, and wherein said secondary yoke (3) is positioned at least substantially within said primary yoke (1) and wherein the primary yoke (1) includes a closed substantially cylindrical protuberance (8) in each leg of the U-shaped cross section at the location of the pivot axis (2), which protuberance (8) forms a substantially cylindrical bearing surface.

6 Claims, 2 Drawing Sheets

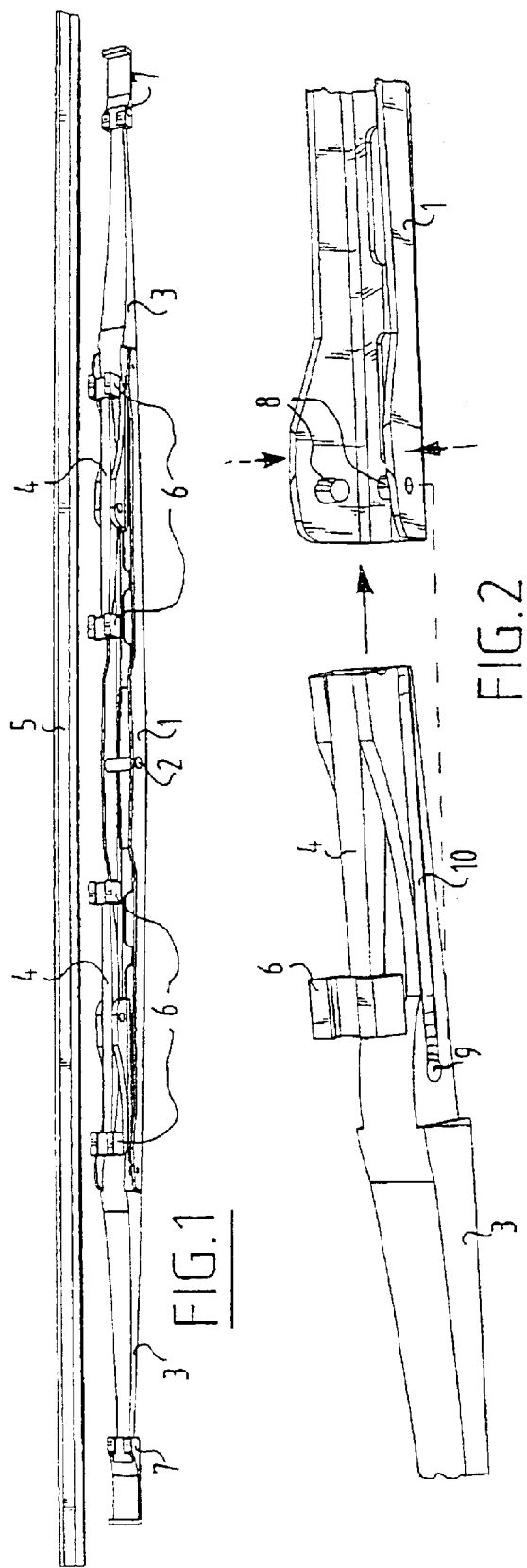
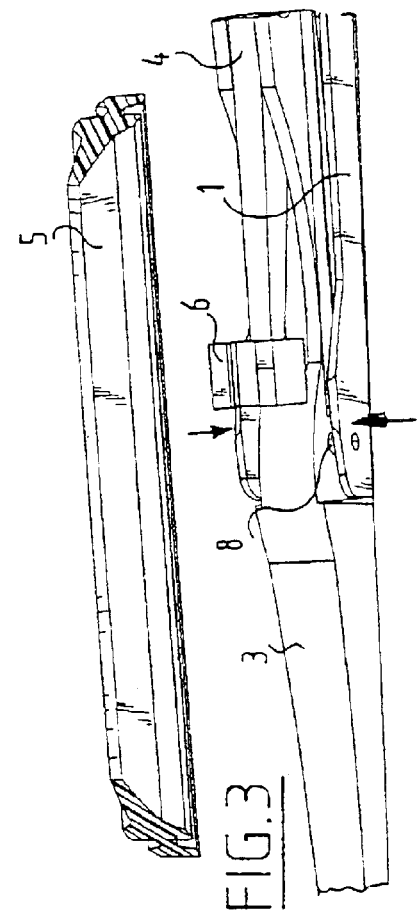
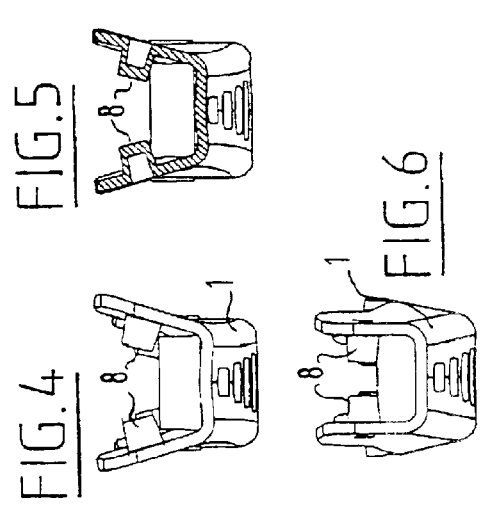

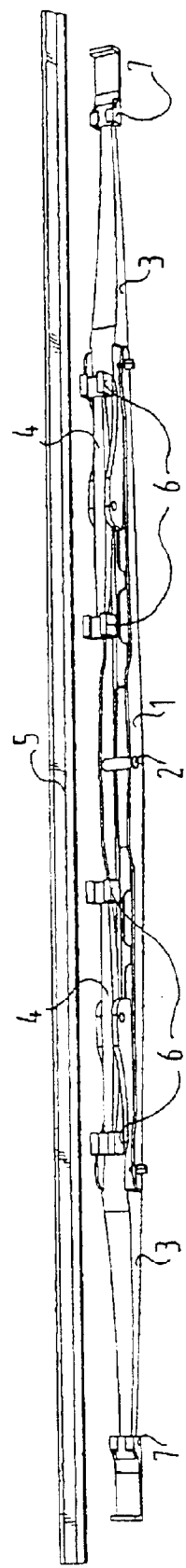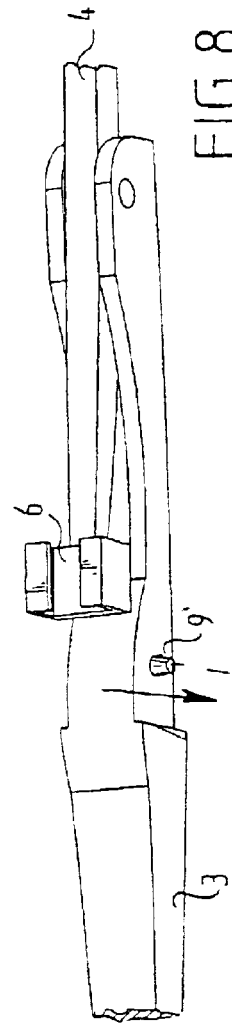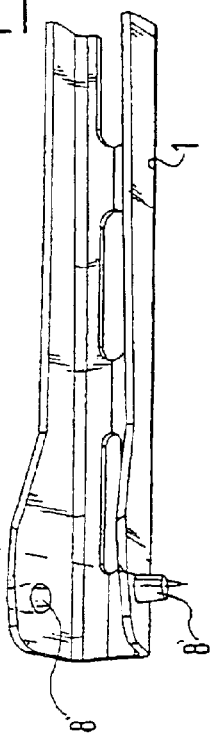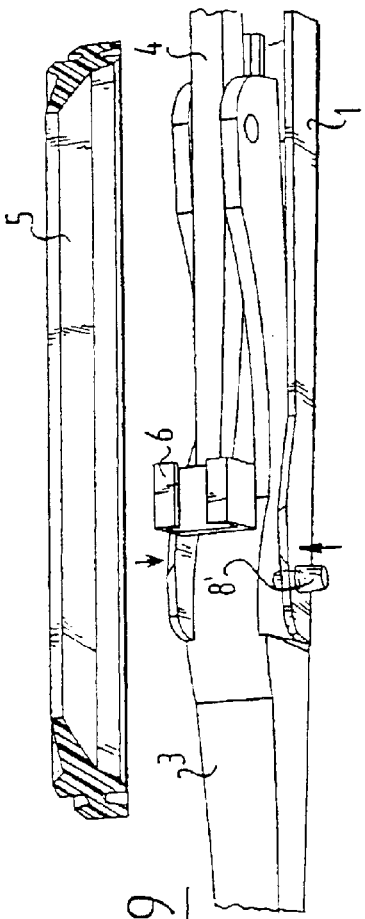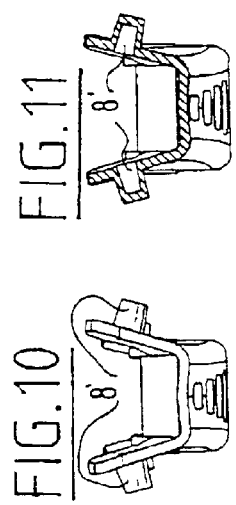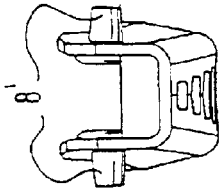

WINDSCREEN WIPER DEVICE

BACKGROUND OF THE INVENTION

The invention relates to a windscreen wiper device comprising an oscillating arm and a frame connected thereto for receiving a wiper blade, which frame includes a yoke which is pivotally connected to a carrier about a pivot axis, wherein both the carrier and the yoke are of at least substantially U-shaped cross section at the location of their interconnection, and wherein said yoke is positioned at least substantially within said carrier.

A windscreen wiper device of this kind is known from British patent No. 2,139,528 (Trico-Folberth Ltd.). In this prior art windscreen wiper device, each leg of the U-shaped cross section of the yoke includes a protrusion at the location of the pivot axis, which protrusion extends into a corresponding through hole in one of the legs of the U-shaped cross section of the carrier in the operating condition. In said operating condition, the yoke is pivots about a pivot axis relative to the yoke. Before the operating condition is reached, the yoke is first placed into the carrier, whereby the legs of the U-shaped cross section of the carrier occupy an initial position, that is, extend outwards relative to the yoke. Then the legs of the U-shaped cross section of the carrier are bent inwards by exerting an external force in inward direction relative to the yoke, wherein the protrusions of the yoke extend into the corresponding through holes in the carrier. The legs of the U-shaped cross section of the carrier remain in said bent position, thus securing the operating position.

One drawback of the windscreen wiper device as known from the aforesaid British patent publication is the fact that it has become apparent that it is not possible to cut or saw the above-indicated through holes in the legs of the U-shaped cross section of the carrier with sufficient precision. In practice this means that some play will develop between the protrusions of the yoke and the holes in the carrier after some time. This play will even increase as a consequence of the legs of the U-shaped cross-section of the carrier springing back in outward direction (relative to the yoke) after some time. In that case there is absolutely no question of a wear-resistant connection between the yoke and the carrier, nor of substantially frictionless pivoting of the yoke about the pivot axis. Consequently, there is absolutely no question of a durable connection between the yoke and the carrier in accordance with the aforesaid British patent. Another drawback of the prior art windscreen wiper device is the fact that in particular dirt can accumulate in the through holes that are present in the legs of the U-shaped cross section of the carrier, which likewise affects the durability of the connection between the yoke and the carrier.

SUMMARY OF THE INVENTION

The object of the invention is to overcome the above drawbacks of the prior art and in particular to provide a windscreen wiper device wherein the connection between the yoke and the carrier is durable and solid, i.e. wherein particularly there is no angular play between the carrier and the yoke.

In order to accomplish that objective, a windscreen wiper device of the kind mentioned in the introduction is according to the invention characterized in that the carrier includes a closed substantially cylindrical protuberance in each leg of the U-shaped cross section at the location of the pivot axis, which protuberance forms a substantially cylindrical bearing surface. In one preferred variant, the protuberances extend outwards on either side relative to the yoke, the yoke being provided at the location of the pivot axis with a protrusion in each leg of its U-shaped cross section, which protrusion pivotally engages in a corresponding protuberance of the carrier. Since the protuberances extend outwards, the two protrusions of the yoke, which function as bearing supports, are spaced relatively far apart, as a result of which the forces on said bearings are relatively small. In another preferred variant, the protuberances extend inwards on either side relative to the yoke, wherein the yoke includes a recess in each leg of its U-shaped cross section, at the location of the pivot axis, in which a corresponding protuberance of the carrier pivotally engages. In this connection, the term "closed protuberance" is understood to mean a dished part, that is, a part of the material of the legs of the U-shaped cross section of the carrier that is locally pushed aside, in such a manner that no opening in the sense of a through hole is formed. In the former preferred embodiment, the material is pushed outwards, whilst in the latter preferred embodiment the material is pushed inwards. An important advantage of the closed protuberance or dished part is that the shape thereof can be determined with great precision by stamping or punching, so that there is no question of play between the yoke and the carrier. Another advantage is furthermore the fact that dirt from outside cannot accumulate in the protuberances.

In one preferred embodiment of a windscreen wiper device according to the invention, the yoke is externally formed with a longitudinal groove in at least one leg of its U-shaped cross section, along which groove a protuberance of the carrier is guided when the yoke is at least substantially received in the carrier in the longitudinal direction of the carrier. This enables sliding movement of the yoke in the carrier in the longitudinal direction of said carrier, wherein the former longitudinal groove functions as a guide for a protuberance of the carrier, in which case said protuberance extends inwards relative to the yoke, of course.

The invention furthermore relates to a method of S manufacturing a windscreen wiper device according to the invention, wherein the two closed protuberances are stamped in the sheet material from which the carrier is made before the material is given its U-shaped section. In one preferred embodiment, the yoke is placed at least substantially within the carrier and connected thereto in an initial position, in which protrusions formed in the legs of the U-shaped cross section of the yoke engage at least partially at the location of the pivot axis in protuberances of the carrier extending outwards on either side relative to the yoke, thus leaving some play between the yoke and the carrier, and wherein the yoke is then connected to the carrier in a final position, without play, by bending the legs of the U-shaped cross section of the carrier inwardly relative to the yoke. In another preferred embodiment, the yoke is placed at least substantially within the carrier and connected thereto in an initial position, wherein protuberances of the carrier extending inwards on either side relative to the yoke engage at least partially at the location of the pivot axis in recesses formed in the legs of the U-shaped cross section of the yoke, thus leaving some play between the yoke and the carrier, and wherein the yoke is then connected to the carrier in a final position, without play, by bending the legs of the U-shaped cross section of the carrier inwardly relative to the yoke. In both embodiments the protuberances according to the invention are dimensioned such that, even when the legs of the U-shaped cross-section of the carrier will spring back a little bit in outward direction relative to the yoke after being bent in inward direction in the final position, angular play between the carrier and the yoke does not occur.

It is noted that from French patent No. 2,453,757 (Ducellier et Cie.) a connecting construction is known wherein a convex protrusion is present on each leg of the U-shaped cross section of the yoke, which protrusion fits in a corresponding recess in each leg of the U-shaped cross section of the carrier. A cylindrical bearing surface is not provided here, however, so that there is absolutely no question of a properly functioning and reliable connection between the yoke and the carrier.

BRIEF DESCRIPTION OF THE DRAWINGS

The invention will be explained in more detail hereafter with reference to figures illustrated in a drawing, wherein:

FIGS. 1–6 refer to one embodiment; and

FIGS. 7–12 relate to the other embodiment.

DETAILED DESCRIPTION OF THE INVENTION

FIGS. 1 and 7 show a perspective view of a wiper frame, which consists of a first yoke (1), which can be pivotally attached to an oscillating arm of a windscreen wiper device of a vehicle at the location of pivot axis (2). The first yoke (1) functions as the carrier of two secondary yokes (3), which secondary yokes (3) function as the carriers of two tertiary yokes (4). All yokes are pivot-mounted in their respective carriers, so that a force exerted at the location of pivot axis (2) is distributed more or less evenly over the ends of the tertiary yokes (4), capable of being transferred to a rubber wiper blade (5), which can be fitted between the claws (6) of the tertiary yokes (4) and between the claws (7) of the secondary yokes (3).

The pivoted joint between each yoke (3,4) and its respective carrier (1,3) is effected without the interposition of a special separate joint part made of plastic material, for example, because only the first yoke (1) is made of metal and the other yokes (3,4) are made of plastic material. In case all yokes (1,3,4) are made of metal, such a special separate plastic joint part is used after all.

FIGS. 2 and 8 show a perspective view on the manners the secondary yokes (3) are manoeuvred into the carrier (1), wherein in accordance with FIG. 2 the secondary yokes (3) are slid inside the carrier (1) in the longitudinal direction thereof, while according to FIG. 8 the secondary yokes (3) are brought inside the carrier (1) in vertical direction, that is perpendicular to the carrier (1). However, in both manners (FIGS. 2 and 8) the secondary yokes (3) are clipped into the carrier in an initial position. In the manner according to FIG. 2 closed substantially cylindrical protuberances (8) in the legs of the U-shaped cross section of the pivot axis, extending inwards on either side relative to the secondary yokes (3), are clipped into recesses (9) in the legs of the U-shaped cross section of the secondary yokes (3). However, in this initial position there is still play between the secondary yokes (3) and the carrier (1), so that there is a "rattling" connection between them. In order to achieve a durable and reliable connection the secondary yokes (3) are connected to the carrier (1) in a final position (without play), by bending the legs of the U-shaped cross section of the carrier (1) inwardly relative to the secondary yokes (3). The above explained initial (before bending the legs) and final (after bending the legs) positions are shown in FIGS. 4, 5 on the one hand and FIG. 6 on the other hand, respectively. FIGS. 4, 5 and 6 are side views, whereas FIG. 5 is a partial cross-sectional side view. The aforesaid closed substantially cylindrical protuberances (8) are manufactured through a stamping or punching process, thereby accurately defining the shape thereof. The protuberances (8) are guided along grooves (10) on either side of the secondary yokes (3) in order to slide the latter inside the carrier (1) in a controllable order and easy manner. As can be seen from FIG. 2, grooves (10) extend until the holes (9). Finally, the rubber wiper blade (5) is fixed to the frame (FIG. 3).

FIGS. 8–12 correspond to FIGS. 2–6 on the understanding that FIGS. 8–12 relate to the second embodiment, wherein the protuberances (8') extend outwards on either side relative to the secondary yokes (3). Therefore, the yokes (3) are provided at the location of the pivot axis with protrusions (9') in the legs of the U-shaped cross section thereof. In the initial position mentioned before (FIGS. 10 and 11) they are clipped into the protuberances (8'), thus realizing a "rattling" connection between the secondary yokes (3) and the carrier (1), whereas in the final position (FIG. 12) the legs of the U-shaped cross section of the carrier (1) are bent inwardly relative to the secondary yokes (3), thus achieving an excellent connection. Also the protuberances (8') are made by a stamping or punching process.

What is claimed is:

1. A windscreen wiper device comprising an oscillating arm and a frame connected thereto for receiving a wiper blade, which frame includes a yoke which is pivotally connected to a carrier about a pivot axis, wherein both the carrier and the yoke are of at least substantially U-shaped cross section at the location of their interconnection, and wherein said yoke is positioned at least substantially within said carrier, characterized in that said carrier includes a closed substantially cylindrical protuberance in each leg of the U-shaped cross section at the location of the pivot axis, which protuberance forms a substantially cylindrical bearing surface, and wherein said yoke is externally formed with a longitudinal groove in at least one leg of its U-shaped cross section, along which groove said protuberances of said carrier are guided when said yoke is at least substantially received in said carrier in the longitudinal direction of said carrier.

2. A windscreen wiper device according to claim 1, wherein said protuberances extend inwards on either side relative to the yoke.

3. A windscreen wiper device according to claim 2, wherein the yoke includes a recess in each leg of its U-shaped cross section, at the location of the pivot axis, in which a corresponding protuberance of the carrier pivotally engages.

4. A windscreen wiper device according to claim 1, wherein said carrier is made of a metal and wherein said yoke is made of a plastic material.

5. A method of manufacturing a windscreen wiper device according to claim 1, wherein the two closed substantially cylindrical protuberances are stamped in the sheet material from which the carrier is made before the material is given its U-shaped cross section.

6. A method according to claim 5, wherein said longitudinal groove is formed externally in at least one leg of the U-shaped cross section of the yoke, along which groove said protuberance of said carrier is guided when the yoke is at least substantially received in said carrier in the longitudinal direction of said carrier.

* * * * *